US012673341B2

(12) United States Patent
Heddergott

(10) Patent No.: US 12,673,341 B2
(45) Date of Patent: Jul. 7, 2026

(54) METHOD FOR OPERATING A COLD GLUE APPLICATION DEVICE, AND DEVICE FOR APPLYING COLD GLUE

(71) Applicant: 4BoxProducer.com Ltd., Sofia (BG)

(72) Inventor: Bertram Heddergott, Buettstedt (DE)

(73) Assignee: 4BoxProducer.com Ltd., Sofia (BG)

( * ) Notice: Subject to any disclaimer, the term of this patent is extended or adjusted under 35 U.S.C. 154(b) by 145 days.

(21) Appl. No.: 18/844,141

(22) PCT Filed: Mar. 6, 2023

(86) PCT No.: PCT/EP2023/055607
§ 371 (c)(1),
(2) Date: Sep. 5, 2024

(87) PCT Pub. No.: WO2023/170000
PCT Pub. Date: Sep. 14, 2023

(65) Prior Publication Data

US 2025/0178014 A1 Jun. 5, 2025

(30) Foreign Application Priority Data

Mar. 8, 2022 (DE) .................... 10 2022 105 438.1

(51) Int. Cl.
*B05D 5/10* (2006.01)
*B05B 17/06* (2006.01)

(52) U.S. Cl.
CPC ................ *B05B 17/06* (2013.01); *B05D 5/10* (2013.01)

(58) Field of Classification Search
CPC ................................ B05D 5/10; B05B 17/06
See application file for complete search history.

(56) References Cited

U.S. PATENT DOCUMENTS

| | | | | |
|---|---|---|---|---|
| 5,405,085 | A | 4/1995 | White | |
| 7,942,344 | B2 | 5/2011 | Morselli | |
| 10,183,307 | B2 * | 1/2019 | Duss | B05B 15/55 |
| 11,951,503 | B2 | 4/2024 | Droco | |
| 2003/0127530 | A1 * | 7/2003 | Heide | B05B 15/555 134/21 |
| 2007/0145164 | A1 | 6/2007 | Ahmadi | |
| 2008/0041428 | A1 | 2/2008 | Morselli | |
| 2017/0030937 | A1 | 2/2017 | Looser | |
| 2018/0186494 | A1 * | 7/2018 | Kronseder | B05D 5/10 |
| 2020/0086338 | A1 | 3/2020 | Hogan | |

FOREIGN PATENT DOCUMENTS

| | | |
|---|---|---|
| DE | 10 2016 000 064 | 7/2017 |
| DE | 10-2020-117-624 | 1/2022 |

* cited by examiner

*Primary Examiner* — Michael P Wieczorek
(74) *Attorney, Agent, or Firm* — Gerald E. Hespos; Michael J. Porco

(57) ABSTRACT

A method is provided for operating a cold glue applicator device having an applicator connected to a glue reservoir so that cold glue can be applied to a target material. The method includes: generating moist air by using a moist air generating device that has an ultrasonic evaporator; and feeding the generated moist air as inflow air that flows externally against the applicator. An inflow temperature, namely the temperature of the inflow air, is set by a temperature adjusting device. The inflow temperature is set to a temperature value above the dew point temperature of the inflow air. A corresponding cold glue applicator also is provided.

14 Claims, 1 Drawing Sheet

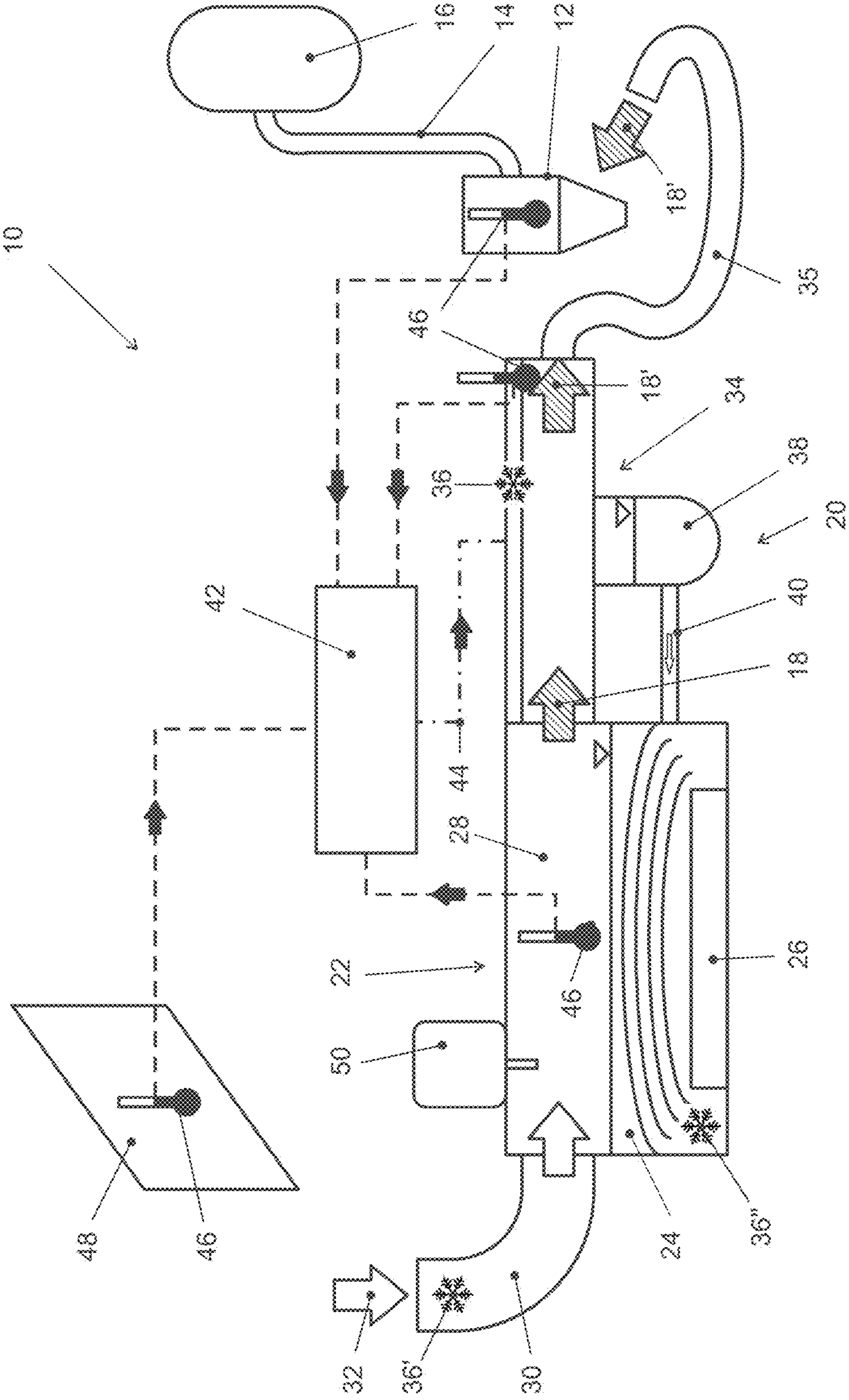
10
16
14
12
18'
35
46
34
36
38
20
42
40
18
44
28
22
26
46
50
48
24
36"
32
36'
30

METHOD FOR OPERATING A COLD GLUE APPLICATION DEVICE, AND DEVICE FOR APPLYING COLD GLUE

FIELD OF THE INVENTION

The invention relates to a method of operating a cold glue applicator having applicator means connected to a glue reservoir by means of which applicator means cold glue can be applied to a target material. The invention further relates to a device for applying cold glue to a target material.

PRIOR ART

A generic method for operating a cold glue applicator and a corresponding cold glue applicator are known from EP 2 878 382 A1, which is a counterpart of U.S. Pat. No. 10,183,307.

The application of cold glue, i.e. aqueous dispersion adhesives, to different target materials is a task frequently given in the industry. The production of folding boxes, the processing of corrugated cardboard, the manufacture of envelopes and mailing bags etc. are just a few examples of applications. The use of paper, cardboard or paperboard as target material is widespread, but by no means limiting. Automated systems are commonly used to achieve high production volumes.

The cold glue is often transferred without direct contact between the application means and the target material by means of one or more dosing valves, which eject the cold glue at predetermined times and in well-dosed portions onto the target material positioned in a transfer area. Such dosing valves usually operate electromagnetically. Other drive concepts, such as pneumatic, piezoelectric or hydraulic concepts, are also known and can be used in principle. The usual dosing valve is an intermediate vessel connected to a glue reservoir via lines and under pressure, which is provided with an application nozzle that acts into the transfer area and, in particular, ejects glue into the transfer area. The glue reservoir can, for example, be a pressurized container or a suction container of an intermediate pump. The application nozzle is typically conical on the outside and has a coaxial glue channel. This can be opened and closed in the dosing valve by means of an axially movable valve body. In the open state, glue is propelled through the glue channel into the transfer area and in particular onto the target material by the pressure prevailing in the dosing valve. This is not possible when the valve is closed. Dosing is carried out by precisely adjusting the pressure, opening size and opening time, taking into account the properties, in particular the viscosity of the glue.

Other forms of applicators are also known, e.g. applicator rollers, —clichés or —plungers.

A central problem of automated cold glue application devices is the contamination of the application nozzle or, in general, the application means and/or the environment. Glue splashes, so-called satellites, which can occur in a variety of ways, e.g. due to centrifugal forces, rebound, drop formation in dead volumes, etc., dry quickly and form adhesion points for further satellites, so that "beards", "threads" and similar soiling structures quickly form, which hinder the correct application of glue. For example, targeted glue portions from an application nozzle can be deflected by such contamination structures; it is also possible that such structures lead to smearing of applied glue on the target material.

DE 10 2016 000 064 A1 attempts to avoid the soiling problem by structuring the surface of the application nozzle.

In particular, the outside of the application nozzle is to be provided with a so-called "lotus effect" in order to allow satellites to run off before they dry. However, it seems unlikely that a general, universally applicable "lotus structure" suitable for a wide variety of cold glues with their different viscosity properties can be found.

It is known from EP 2 386 363 A2 to build up an electric field around the nozzle outlet and thus electrostatically deflect the resulting satellites onto special collecting structures. These collecting structures, which in principle must be located close to the transfer area, become increasingly contaminated, which merely delays the problems described above It is known from EP 1 802 191 A2 and its counterpart US2007/145.164 that the application nozzle can be provided with replaceable covers so that only the cover needs to be replaced and the nozzle itself does not need to be cleaned when soiled. However, replacing the protective cover requires a production stop and is technically complicated in complex systems with a large number of closely spaced, delicate nozzles.

It is known from EP 0 568 365 B1 and its counterpart U.S. Pat. No. 5,405,085 to position a cleaning nozzle directly next to each application nozzle, which sprays dirty application nozzles with cleaning fluid during downtimes of the system and thus cleans them. This approach is technically extremely complex, requires a lot of installation space and is also limited to idle times of the system.

From the generic EP 2 878 382 A1, and its counterpart U.S. Pat. No. 10,183,307 mentioned at the beginning, it is known to feed a space upstream of the nozzle opening with warm moist air, which condenses on the cooled nozzle tip. The condensation produced at the nozzle tip is intended to dissolve dried glue or prevent it from drying in the first place. This is disadvantageous in that the glue itself, which passes through the upstream moist air space during application, can also absorb moisture and thus dilute. Another disadvantage is that the formation of condensation at the nozzle tip can lead to water droplets falling onto the target material or even being carried there by the glue. Particularly in an already humid environment, the continuous discharge of warm moist air can also lead to condensation on other system components, such as in particular the inner and outer walls of hose lines and/or on the walls of the installation room of the system, which worsens the working conditions for the operating personnel of the systems or requires considerable additional ventilation and drying effort, which is not always applied in countries with tropical or subtropical climates in particular. Especially in and on hose lines, particularly in air hose lines, condensation can also lead to blockages and thus to disruptions in the operating process. Nevertheless, the basic idea of exposing the application nozzle to a moist air atmosphere in order to prevent glue drying must be regarded as a promising approach.

A similar approach is taken in DE 101 18 631 A1 and its counterpart U.S. Pat. No. 6,902,621.

EP 3 838 430 A1 and its counterpart U.S. Pat. No. 11,951,503 describes a paint mixing and dosing system whose vertical outlet pipe, which combines the outlet nozzles of different paint lines, is closed during idle times of the system by means of a cup which is sealingly attached to the bottom of the pipe outlet. To prevent the paint from drying on the outlet nozzles, the cup, which is equipped with a heating device, is filled with water, which evaporates during heating and creates a moisture-saturated atmosphere in the outlet pipe. To eliminate the need for a separate water connection, the system has a Peltier cooling trap that draws in and cools the ambient air and pumps the resulting moisture, i.e. the condensation water produced during cooling, into the said cup.

OBJECT OF THE INVENTION

It is the task of the present invention to improve a generic method and a generic device in such a way that the formation of condensation on the application means and/or other system elements, such as the moist air supply device, or walls of the system installation space is reduced.

EXPLANATION OF THE INVENTION

This object is achieved in conjunction with the features of the generic method in that the inflow temperature is set to a temperature value above, in particular at most 5° C. above, particularly preferably at most 2° C. above the dew point temperature of the inflow air.

The object also is achieved in conjunction with the features of the generic device in that the ultrasonic evaporator interacts with the temperature adjusting device in such a way that the inflow temperature is above, in particular at most 5° C. above, particularly preferably at most 2° C. above the dew point temperature of the inflow air.

As is generally known from the prior art, the moist air is generated by means of so-called ultrasonic evaporators. These are open water baths that are set into high-frequency oscillation during operation by means of an ultrasonic transducer, whereby water is propelled out of the surface layer of the water bath in very small droplets and is evaporated very quickly in the air supplied, i.e. in the supply air, due to the large surface area of the droplets relative to their volume. In this way, it is possible to create saturated moist air, i.e. air with a relative humidity of approximately 100%. The invention now provides for the moist air to be made available at a well-defined temperature which is selected in such a way that the water does not condense out on contact with the application means, in particular an application nozzle. The temperature of the inflow air, i.e. the air that comes into direct contact with the application means, is strongly influenced by the temperature of the application means. In particular, almost complete equalization can be assumed if the flow velocities are not too fast. In this state, the actual temperature of the moist air must still be above its dew point temperature in order to avoid condensation; on the other hand, it should preferably be only slightly higher so that the application means are surrounded by moist air that is as saturated as possible, so that glue drying is avoided. It is also preferable for the temperature of the moist air to be controlled in such a way that condensation does not form at other critical points of the cold glue application device or its surroundings. In particular, the focus here is on the moist air supply device, other surfaces of the machine and/or walls and/or floors of the installation space of the device. In the following, these will be referred to collectively as peripheral surfaces.

Different technical approaches are conceivable for the realization of such tempered inflow air. In a first process variant, it is envisaged that the temperature adjusting device has a cooling trap through which the moist air passes before it is fed to the application means and in which the moist air is cooled to a target temperature that is dimensioned so that the inflow air has the inflow temperature. In the context of the device according to the invention, this means that the temperature adjusting device comprises a cooling trap and a control device that controls the cooling trap, wherein the control device is arranged to control the cooling trap for cooling moist air coming from the evaporator to a target temperature that is dimensioned such that the inflow air has the inflow temperature. In this embodiment, the moist air produced is the object of the temperature control. Before the inflow against the application means, in particular the application nozzle, the already generated moist air is cooled by means of the cooling trap, which can be Peltier-operated, for example. The cooling is carried out to such an extent that the dew point properties of the inflow air according to the invention, i.e. at the location of the application means, are fulfilled. This can mean that the moist air is cooled directly to the inflow temperature; however, it is also possible to select a different target temperature if temperature changes independent of the temperature adjusting device are to be expected on the further path of the moist air to the application means, e.g. due to contact with line elements of the feed device. These can be "priced" into the selection of the target temperature of the temperature control unit on a case-by-case basis. During cooling, the moist air retains its properties as saturated moist air, i.e. its relative humidity of around 100%; however, the absolute water load that the air contains in the form of water vapor decreases with the temperature. Therefore—this is the essence of a cold trap—moisture precipitates in liquid form from the cooled moist air and condensation forms, which can be stored in the cold trap and/or removed for further use as explained below. Behind the cold trap, the application means, in particular the application nozzle, continue to receive a flow of saturated moist air. In such an atmosphere around the application means, in particular the application nozzle, the glue does not dry out. However, if the inflow temperature is below the nozzle temperature, as provided for in the invention, condensation, which is to be avoided in accordance with the invention, does not occur on the application means, in particular the application nozzle. Especially in cases in which the inflow temperature is only slightly below the temperature of the application means, in particular the nozzle temperature of the application nozzle, the relative humidity remains at almost 100% even in the immediate vicinity of the application means, where the inflow air heats up slightly due to contact with them (without absorbing additional water). In other words, the effect of preventing drying is almost completely maintained, whereas condensation on the application means, which is recognized as a disadvantage, does not occur.

Alternatively, or in addition to the cooling trap, it may be provided that the temperature adjusting device has a water bath cooler, by means of which a water bath is cooled in such a way that a generation temperature, namely the temperature at which the moist air is generated, is set such that the inflow air has the inflow temperature. In the context of the device according to the invention, this means that the temperature adjusting device has a water bath cooler and a control device that controls the water bath cooler, wherein the control device is arranged to control the water bath cooler to cool the water bath to a target temperature that is dimensioned so that the inflow air has the inflow temperature. In this variant, it is not the generated moist air that is cooled, but the water used to generate it. This variant has advantages in terms of cooling efficiency due to the high heat capacity and thermal conductivity of liquid water. For the rest, reference can be made to what was said in the context of the cold trap variant.

In embodiments with a water bath cooler, the temperature of the supply air should also be taken into account. Thus, alternatively or additionally, it may be provided that the temperature adjusting device has a supply air cooler, by means of which the supply air is cooled in such a way that a generation temperature, namely the temperature at which the moist air is generated, is set such that the inflow air has the inflow temperature. In the context of the device according to the invention, this means that the temperature adjusting device has a supply air cooler and a control device which controls the supply air cooler, wherein the control device is arranged to control the supply air cooler for cooling the supply air to a target temperature which is dimensioned such that the inflow air has the inflow temperature.

Condensation on peripheral surfaces can also be prevented in a similar way. For this purpose, the inflow temperature must be set to a temperature value below, in particular at least 2° C. below, especially preferably at least 5° C. below the temperature of the peripheral surface of interest in the specific case. This is because if the moist air emerging as the inflow air for the application means is then distributed in the room and hits a peripheral surface, condensation will not occur there if the above-mentioned relative temperature conditions are met.

A peripheral surface where condensation prevention is particularly important is the moist air supply unit itself. This can be designed as a hose or pipe system, for example. If water condenses inside it, this can lead to clogging and thus to the prevention or at least reduction of the entire supply of moist air for the application means, in particular the application nozzle.

It is conceivable, for example, that the inflow temperature is fixed on the basis of empirical values. It is more complex, but more favorable in terms of the precision of the result, if a setting specification for the inflow temperature is continuously determined on the basis of repeated temperature measurements and the temperature adjusting device is controlled to adjust the inflow temperature accordingly. In the context of the device according to the invention, this means that the control device is arranged to continuously determine a setting specification for the inflow temperature on the basis of temperature measurements and to control the temperature adjusting device to adjust the inflow temperature accordingly. With such an arrangement, considerable changes in the operating parameters, e.g. ambient temperature differences between day and night shifts, heating due to motor operation, individually different climate preferences of the operating personnel, etc., can easily be compensated for. The system according to the invention can always be operated with an optimum compromise between prevention of glue drying, i.e. sufficiently high moisture saturation of the inflow air, on the one hand, and condensation prevention, i.e. temperature control below the temperature of those elements on which condensation is to be prevented, on the other hand.

As already mentioned, the person skilled in the art can select the reference temperature depending on the requirements of the individual case. This also applies, in particular, in the case of the tracking operating mode outlined above. This means that in a preferred embodiment, the temperature measurements are used to determine a nozzle temperature of an application nozzle, an air temperature of the room air at the installation site of the cold glue application device or a temperature of a peripheral surface. For example, a wall and/or floor temperature of room boundaries at the installation site of the cold glue application device and/or a temperature of peripheral machine parts can be determined. Peripheral machine parts are understood here to be parts of the cold glue application device itself, which are not central elements of the invention that directly serve to guide the moist air, but also parts of neighboring machines on which condensation could form. Conveyor chains for conveying the target material or the like are mentioned purely by way of example. In the context of the device according to the invention, this means that a temperature measuring device is also included, by means of which a nozzle temperature of an inflow nozzle, an air temperature of the room air at the installation location of the cold glue application device or a temperature of a peripheral surface can be measured, wherein the control device is arranged to control the temperature measuring device to carry out such measurements as said temperature measurements.

As an alternative to measuring a base temperature, which is to serve as the basis for determining the reference temperature for setting the inflow temperature, such a base temperature can also be estimated and set manually. It is also conceivable that it is taken from other sources and, if necessary, communicated electronically. For example, it can be expedient if the independently set default temperature for room air conditioning is communicated as the base temperature to the device according to the invention, whose control device uses it to determine the reference temperature for setting the inflow temperature.

The condensation water produced when cooling the moist air coming from the evaporator, i.e. when reducing its absolute humidity content in the cold trap, can be discharged as waste water. Alternatively, it can be fed into an existing cooling water system. It is particularly preferable for the moisture that precipitates in the cold trap, i.e. the condensation water that accumulates there, to be fed back into the water bath. The water can then be used to generate new moist air. In the context of the device according to the invention, this means that the cold trap is connected to the water bath in a liquid-conducting manner by means of a return line, so that liquid precipitating in the cold trap can be fed back to the water bath via the return line.

In particular—but not only—in systems with such water recycling, it appears favorable if the moist air and/or water used to generate it is treated antibacterially and/or fungicidally in the moist air generation device. In the context of the device according to the invention, this means that the moist air generation device is arranged to treat moist air and/or the water bath antibacterially and/or fungicidally. For example, the moist air generation device can comprise a chemical dosing unit that specifically adds antibacterial and/or fungicidal active substances to the water bath. Preferably, these are substances that are vaporized together with the water so that elements exposed to the resulting moist air are also protected against fungal and/or bacterial infestation. Such a safety measure is particularly recommended when operating the device according to the invention in a warm, humid environment, such as in countries with a subtropical or tropical climate.

In particular, the moist air supply device or the line components used for its construction, such as hoses and/or pipes, are susceptible to fungal and/or bacterial infestation. In order to be able to detect such infestation at an early stage, a further development of the invention provides for said line components to be made of an optically transparent material. The early detection of contamination allows such components to be cleaned or replaced in good time.

Further details and advantages of the invention can be seen from the following special description and the drawings.

BRIEF DESCRIPTION OF THE DRAWINGS

FIG. 1 is a highly schematized representation of an embodiment of a cold glue application device according to the invention.

DESCRIPTION OF PREFERRED EMBODIMENTS

FIG. 1 shows a highly schematized embodiment of a cold glue application device 10 according to the invention. Its component serving for the actual glue application, the special design of which is not relevant in the context of the present invention, is symbolically represented by the application nozzle 12, which is connected to a glue reservoir 16 via a glue line 14. By means of the application nozzle 12, cold glue can be applied from the glue reservoir 16 to a target material not shown in the transfer area (below the application nozzle 12).

To prevent the cold glue from drying on the application nozzle 12, moist inflow air 18' flows around it. A moist air generation device 20 is used to generate the inflow air 18'. The moist air generation device 20 comprises an evaporator 22, which is designed as an ultrasonic evaporator. For this purpose, the evaporator 22 comprises a water bath 24, which is operatively connected to an ultrasonic transducer 26. The ultrasonic transducer 26 generates high-frequency vibrations in the water bath 24, which ensure that small water droplets are propelled into the evaporation chamber 28 located above the level of the water bath 24, where they are absorbed by supply air 32 transported in via an intake pipe 30 and evaporated. The supply air 32 is thereby converted into moist air 18, which is completely or at least almost completely saturated with moisture, i.e. has a relative humidity of approximately 100%. In order to generate the moist air 18 already at a temperature that is as close as possible to the target temperature that leads to the desired inflow temperature being reached in the region of the application nozzle 12, in the embodiment shown both the supply air 32 and the water bath 24 are cooled with corresponding cooling means, namely with a supply air cooler 36' and a water bath cooler 36". In the embodiment shown, the moist air 18 generated is passed through a cold trap 34, in which it is cooled by means of a cooler 36, which can be designed as a Peltier element, for example. The resulting moisture, i.e. condensation water, is collected in a collection tank 38. In the embodiment shown, the collection tank 38 is connected to the water bath 24 via a return line 40, so that the condensation water accumulating in the collection tank 38 can be fed back to the evaporator 22. The cooled, saturated moist air 18' is thus available at the outlet of the cold trap 34. This is then fed to the application nozzle 12 via a moist air supply device 35, which in the embodiment shown is designed as a hose, and which is thus supplied with the moist air acting here as the inflow air 18'.

The cold glue application device 10 according to the invention further comprises a control device 42, which is connected to the cold trap 34 and the coolers 36', 36" via control lines 44 and is able to control their operation, in particular the extent of the cooling there. Furthermore, a temperature measuring device is provided which, in the embodiment shown, has a plurality of temperature sensors 46. In particular, temperature sensors 46 are provided for detecting the nozzle temperature of the application nozzle 12 and for detecting the moist air temperature at the outlet of the cold trap 34. The control device 42 is arranged to adjust the moist air temperature at the outlet of the cold trap 34, i.e. essentially the inflow temperature with which the application nozzle 12 is flowed against, by a predetermined temperature difference above the dew point temperature of the inflow air 18', which in turn should be selected below a predetermined reference temperature, e.g. the nozzle temperature of the application nozzle 12. The dew point temperature should be only slightly below the reference temperature, but with a "safety margin" that prevents derailment of the system, in particular the formation of condensation on the application nozzle 12, even in the event of sudden changes in operating parameters. A temperature difference of 1.5 to 2° C. has proven to be practicable. On the one hand, this ensures that (almost) saturated moist air flows around the application nozzle 12, which prevents cold glue from drying; on the other hand, the temperature difference prevents condensation from forming on the (warmer) application nozzle. Thanks to the constant measurement of the nozzle temperature and the corresponding tracking of the dampening air temperature, this equilibrium is maintained even during long operating and idle times of the system, even if considerable temperature fluctuations occur due to the time of day or operating conditions.

In the embodiment shown, further temperature sensors 46 are provided, in particular one for monitoring the temperature in the evaporator chamber 28, i.e. the moist air temperature at the inlet of the cold trap 34, and one on a wall 48, which is only symbolically indicated and is intended to generally represent the peripheral surfaces previously mentioned in the general part of the description. The latter in particular makes it possible to select the reference temperature in such a way that any formation of condensation is prevented or at least significantly reduced not only on the application nozzle 12, but also on the surrounding room walls (including the floor) and machine surfaces.

As a special feature, the illustrated embodiment also has a chemical dispenser 50, from which the water bath 24 can be inoculated with antibacterial and/or fungicidal substances in order to prevent the spread of corresponding germs with the moist air.

Of course, the embodiments discussed in the specific description and shown in the figures are only illustrative examples of the present invention. In the light of the present disclosure, the skilled person is provided with a wide range of possible variations. In particular, the choice of the reference temperature can be quite complex and include several different measurement results, wherein it is always up to the skilled person in each individual case to demonstrate a suitable compromise between keeping the glue moist and avoiding condensation, taking into account the respective site properties. Cooling of the moist air can also be achieved without the use of all three coolers 36, 36', 36" shown. It is also possible to achieve the same result with only one or any combination of the coolers 36, 36', 36"—in particular also completely without a cold trap 34 or exclusively by means of the cold trap 34.

LIST OF REFERENCE SYMBOLS

10 cold glue application device
12 application nozzle
14 glue line
16 glue reservoir
18 moist air
18' inflow air
20 moist air generation device
22 evaporator
24 water bath

26 ultrasonic transducer
28 evaporation chamber
30 intake pipe
32 supply air
34 cold trap
35 moist air supply unit
36 cooler
36' supply air cooler
36" water bath cooler
38 collection tank
40 return line
42 control device
44 control line
46 temperature sensor
48 wall
50 chemical dispenser

The invention claimed is:

1. A method of operating a cold glue applicator (10) having an application means connected to a glue reservoir (16) so that the application means can apply cold glue to a target material, said method comprising:

generating moist air (18) by means of a moist air generating device (20) comprising an ultrasonic evaporator (22) with an open water bath (24) that is set into-high frequency oscillation during operation by an ultrasonic generator (26), and feeding the generated moist air (18) externally against the application means as inflow air (18'), wherein:

an inflow temperature of the inflow air (18') is set by a temperature adjusting device to a temperature value above the dew point temperature of the inflow air (18'); and the temperature adjusting device has a water bath cooler (36") that cools the water bath (24) so that a generation temperature at which the moist air (18) is generated is set so that the inflow air (18') has the inflow temperature.

2. The method of claim 1, wherein at least one of the moist air (18) and the open water bath in the moist air generating device (20) is treated antibacterially.

3. The method of claim 1, wherein at least one of the moist air (18) and the open water bath in the moist air generating device (20) is treated fungicidally.

4. A method of operating a cold glue applicator (10) having an application means connected to a glue reservoir (16) so that the application means can apply cold glue to a target material, said method comprising:

generating moist air (18) by means of a moist air generating device (20) comprising an ultrasonic evaporator (22) with an open water bath (24) that is set into-high frequency oscillation during operation by an ultrasonic generator (26), and feeding the generated moist air (18) externally against the application means as inflow air (18'), wherein:

an inflow temperature of the inflow air (18') is set by a temperature adjusting device to a temperature value above the dew point temperature of the inflow air (18'); and the temperature adjusting device has a cold trap (34) through which the moist air (18) passes before it is fed to the application means and in which the moist air (18) is cooled to a target temperature, the cold trap (34) is dimensioned such that the inflow air (18') has the inflow temperature.

5. The method of claim 4, wherein moisture precipitating in the cold trap (34) is returned to the water bath.

6. The method of claim 4, wherein moisture precipitating in the cold trap (34) is discharged as waste water and/or as cooling water.

7. The method of claim 4, wherein at least one of the moist air (18) and the open water bath in the moist air generating device (20) is treated antibacterially.

8. The method of claim 4, wherein at least one of the moist air (18) and the open water bath in the moist air generating device (20) is treated fungicidally.

9. A method of operating a cold glue applicator (10) having an application means connected to a glue reservoir (16) so that the application means can apply cold glue to a target material, said method comprising:

generating moist air (18) by means of a moist air generating device (20) comprising an ultrasonic evaporator (22) with an open water bath (24) that is set into-high-frequency oscillation during operation by an ultrasonic generator (26), and feeding the generated moist air (18) externally against the application means as inflow air (18'), wherein:

an inflow temperature of the inflow air (18') is set by a temperature adjusting device to a temperature value above the dew point temperature of the inflow air (18'); and the temperature adjusting device has a supply air cooler (36'), by means of which a supply air (32) is cooled in such a way that a generation temperature, namely the temperature at which the moist air (18) is generated, is set in such a way that the inflow air (18') has the inflow temperature.

10. The method of claim 9, wherein a setting specification for the inflow temperature is continuously determined based on repeated temperature measurements and the temperature adjusting device is actuated for a correspondingly tracking adjustment of the inflow temperature.

11. The method of claim 10, wherein a nozzle temperature of an application nozzle (12), an air temperature of a room air at the installation site of the cold glue applicator (10), a wall temperature and/or floor temperature of room boundaries at the installation site of the cold glue applicator (10) and/or a temperature of peripheral machine parts are determined by the temperature measurements.

12. The method of claim 9, wherein the inflow temperature is fixed.

13. The method of claim 9, wherein at least one of the moist air (18) and the open water bath in the moist air generating device (20) is treated antibacterially.

14. The method of claim 9, wherein at least one of the moist air and the open water bath in the moist air generating device (20) is treated fungicidally.

* * * * *